(12) United States Patent
Tremper, III et al.

(10) Patent No.: US 7,144,526 B2
(45) Date of Patent: Dec. 5, 2006

(54) CONDUCTIVE PRIMER COMPOSITION FOR AMBIENT CURE

(75) Inventors: Henry Stever Tremper, III, Clayton, NJ (US); Henry A. Tronco, Jr., Springfield, PA (US); Valentina Gordin, Princeton, NJ (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 475 days.

(21) Appl. No.: 10/357,828

(22) Filed: Feb. 4, 2003

(65) Prior Publication Data

US 2004/0149960 A1   Aug. 5, 2004

(51) Int. Cl.
*H01B 1/24* (2006.01)
*B05D 5/12* (2006.01)

(52) U.S. Cl. .................. 252/511; 427/58; 427/99.2
(58) Field of Classification Search ............... 252/511; 106/472; 427/58, 99.2, 372.2, 400
See application file for complete search history.

(56) References Cited

U.S. PATENT DOCUMENTS

| | | | |
|---|---|---|---|
| 4,035,265 A | 7/1977 | Saunders | |
| 4,740,426 A | 4/1988 | Tremper, III | |
| 4,740,566 A | 4/1988 | Tremper, III | |
| 5,015,413 A | 5/1991 | Nagaoka | |
| 5,068,063 A | 11/1991 | Tremper, III | |
| 5,114,796 A * | 5/1992 | Frentzel et al. | 428/521 |
| 5,989,460 A | 11/1999 | Corner | |
| 6,413,588 B1 | 7/2002 | Pettus et al. | |

FOREIGN PATENT DOCUMENTS

| | | |
|---|---|---|
| CA | 960395 | 12/1974 |
| EP | 0209395 A2 | 1/1987 |
| EP | 0309286 A2 | 3/1989 |
| EP | 0328711 A1 | 8/1989 |
| EP | 0647688 A2 | 4/1995 |
| WO | WO 99/05193 | 2/1999 |
| WO | WO 00/61302 A2 | 10/2000 |

OTHER PUBLICATIONS

XP-002149703, Jun. 22, 1983, Derwent Publications Ltd., Abstract.
Copy of International Search Report (PCT/US2004/003196) dated Jul. 16, 2004.

* cited by examiner

*Primary Examiner*—Mark Kopec
(74) *Attorney, Agent, or Firm*—Chyrrea J. Sebrea

(57) ABSTRACT

The present invention provides electrically conductive and flexible primer compositions that harden to form conductive materials under room temperature or low bake temperature curing conditions. The primer composition contains solvents and 40–75% by weight of film forming binder and pigments in an overall pigment to binder weight ratio of about 1:100 to 100:100; wherein the binder contains (A) a flexible hydroxy containing polyester resin and
(B) an organic polyisocyanate crosslinking agent; and
wherein the pigments include electrically conductive pigments in a pigment to binder weight ratio of about 1:100 to 130:100 and the electrically conductive pigments consists essentially of a combination of graphite and conductive carbon black pigments in a graphite to carbon black weight ratio of about 120:1 to 1:1, and the composition forms a hard, flexible coating having a surface conductivity of at least 100 Ransburg units when cured at room temperature or low bake conditions. The coating composition can be used on metal or plastic substrates to render the substrate conductive.

12 Claims, No Drawings

CONDUCTIVE PRIMER COMPOSITION FOR AMBIENT CURE

FIELD OF THE INVENTION

The present invention relates to a primer composition and in particular to an electrically conductive and flexible primer composition that hardens to form conductive materials at ambient or slightly elevated temperatures, and to articles comprising one or more layers of these conductive materials.

BACKGROUND OF THE INVENTION

Primers and conductive primers are well known in the art and are widely used in the manufacture of automobiles and trucks. High solids conductive primers used over plastic parts are also well known, as shown in Tremper U.S. Pat. No. 4,740,426 issued Apr. 26, 1988; Tremper U.S. Pat. No. 4, 740,566 issued on Apr. 26, 1988; and Tremper U.S. Pat. No. 5,068,063 issued on Nov. 26, 1991. However, none of these compositions have the ability to dry and form conductive materials at ambient temperatures or low bake temperatures.

In modern auto and truck manufacturing facilities, a topcoat paint is applied by electrostatic spraying. Electrostatic spraying reduces paint loss and air pollution caused by paint over-spraying. To efficiently electrostatically spray a paint, the substrate must be conductive. Most autos and trucks contain flexible plastic components and some auto bodies are constructed entirely from a polymer reinforced fiber glass and others from plastic. These components are not electrically conductive and electrostatic spraying works poorly over such substrates. Also, these components are flexible and require primer and topcoat that is flexible. Another major challenge that faces automotive and truck manufacturers is how to rapidly cure the primer, to render the substrate conductive, using minimal investment in floor space, flash times, and flash drying and baking zones. Conventional primers are unable to cure to a sufficiently conductive state in a relatively short period of time at low temperatures, and thus the productivity and energy efficiency of the painting operation is currently lacking.

There is a great need in auto and truck manufacturing for a high quality primer that is electrically conductive, flexible, has excellent adhesion to the substrate, provides a surface to which conventional coatings will adhere, and that will rapidly cure to a conductive state at ambient or slightly elevated temperatures which would reduce energy cost and increase productivity.

The novel primer composition of this invention has the aforementioned desirable characteristics.

SUMMARY OF THE INVENTION

The invention provides an ambient-cure, conductive, flexible primer composition containing solvents and 40–75% by weight of film forming binder and pigments in an overall pigment to binder weight ratio of about 1:100 to 200:100; wherein the binder contains (A) a hydroxy containing polyester resin and
(B) an organic polyisocyanate crosslinking agent; and
wherein the pigments comprise electrically conductive pigments in a conductive pigment to binder weight ratio of about 1:100 to 130:100, and the electrically conductive pigments consist essentially of graphite and carbon black pigments in a graphite to carbon black weight ratio of about 120:1 to 1:1, and the composition forms a coating having a surface conductivity of at least 100 Ransburg units when cured at ambient or slightly elevated temperatures. The coating composition can be used on plastic substrates or previously coated substrates of either plastic or metals to render the substrate conductive.

By "ambient-cure", it is meant that the coating is able to cure in open air at ambient temperatures (15 to 30° C.) and form a coating having the desired surface conductivity of at least 100 Ransburg units within at least 4 to 8 hours after application.

By curing at "slightly elevated temperatures" or "low bake temperatures", it is meant that the coating is able to cure at low bake conditions of 60° C. and below, typically 50° C. and below, and form a coating having the desired surface conductivity of at least 100 Ransburg units within 30 minutes or less.

DETAILED DESCRIPTION OF THE INVENTION

The primer composition of this invention cures at ambient temperatures or low bake conditions (up to 60° C. for 30 minutes or less) to form finishes that are hard, flexible and electrically conductive and have excellent adhesion to a variety of substrates such as cold roll steel, phosphatized steel, previously coated metals, polyester reinforced fiber glass, reaction injection molded urethanes, partially crystalline polyamides, previously coated plastics, and other plastic substrates and provides a surface to which conventional topcoats will adhere. The primer is particularly useful on the aforementioned plastic substrates since the resulting finish is conductive and topcoats can be applied by electrostatic spraying which is currently being used by many auto and truck manufacturing facilities. The primer composition of this invention also produces a finish that has good shelf stability (i.e., remains sufficiently conductive for at least 1–2 years) and that can also be worked on and repaired quickly after application to remove minor imperfections The primer composition uses a combination of electrically conductive pigments, and in particular a combination of conductive graphite and carbon black pigments, that allows for the development of a conductive primer coating under room temperature or low bake temperature curing conditions. The specific conductive pigment to binder ratio and the graphite to carbon black ratio are carefully selected to provide the development of conductive surface under the room temperature drying conditions.

The primer composition contains pigments, including both conductive and coloring pigments, in an overall pigment to binder weight ratio of about 1:100 to 200:100. Preferably, the pigments are used in a pigment to binder weight ratio of about 50:100 to 150:100, and more preferably about 80:100 to 150:100. Even more critically, the primer composition contains the electrically conductive pigments described above in a pigment to binder weight ratio of about 1:100 to 130:100. Preferably, the electrically conductive pigments are used in a pigment to binder ratio of about 5:100 to 100:100, and more preferably in a ratio of about 10:100 to 80:100. The specific conductive graphite to conductive carbon black weight ratio utilized is also carefully selected to impart the desired air dry conductivity to the composition. In general, the graphite to carbon black weight ratio ranges from about 120:1 to 1:1. Preferably, the graphite to carbon black weight ratio is about 80:1 to 20:1, and even more preferably about 40:1 to 3:1.

The ranges specified above provide a coating that has a surface conductivity of at least 100 Ransburg units and preferably, 125 and above Ransburg units, after curing under room temperature drying conditions. Surface conductivity of the coating composition is measured by a Sprayability Meter manufactured by Ransburg Electrocoating Corporation, Indianapolis, Ind.

In addition to the above ingredients, the conductive primer composition of this invention has a film forming binder component and a liquid carrier which usually is solvent for the binder. Since this invention is directed to a high solids, low VOC composition that meets current pollution regulations, the composition preferably has a film forming binder content of about 40–75% by weight and correspondingly about 25–60% by weight of a liquid carrier.

Preferably, the film forming binder of the composition contains about 50–80% by weight of a polyester copolymer and about 20–50% by weight of an organic polyisocyanate crosslinking agent. One highly preferred composition contains about 60–70% by weight of the polyester copolymer and 30–40% of the crosslinking agent are used and forms a high quality composition.

The polyester copolymer used in the composition has a linear polyester segment with hydroxyl groups that has a hydroxyl number of about 15–300 and a number average molecular weight of about 300–3,000 and has branched polyester segments. These branched segments contain hydroxyl groups and have a hydroxyl number of about 175–300 and a number average molecular weight of about 500–2,000 and are attached to the linear segment by esterification of the hydroxyl groups of the two segments with a diacid or an anhydride. The polyester copolymer has a number average molecular weight of about 800–3,500 and a hydroxyl number of about 50–170.

All molecular weights herein are determined by gel permeation chromatography using polymethyl methacrylate as the standard.

Sommerfeld et al U.S. Pat. No. 4,442,269 issued Apr. 10, 1984, which is hereby incorporated by reference, shows a method for preparing the polyester copolymer used herein. Also, preferred polyester compositions are disclosed.

The linear segment is formed from a straight chain diol and a dicarboxylic acid. Typical diols that are useful have from 2–10 carbon atoms and are for example ethylene glycol, propylene glycol, butane diol, pentane diol, neopentyl glycol, hexane diol, octane diol, Esterdiol 204 (a commercial diol produced by Union Carbide) and the like. Preferred diols are neopentyl glycol and 1,6 hexane diol since these diols form high quality polyesters.

Typical dicarboxylic acids that can be used are aromatic acids such as phthalic acid, orthophthalic acid, isophthalic acid, and aliphatic acids such as adipic acid, azelaic acid and the like.

The branched segment is formed from a straight chain diol, a branched chain polyol and a dicarboxylic acid. The above straight chain diols and dicarboxylic acids are used. Typical branched chain polyols that can be used are trimethylol propane, triethylol propane, pentaerythritol and the like.

The linear and branched segments are attached by esterification of the hydroxyl groups of each segment with a diacid or an anhydride. The aforementioned acids can be used but preferably an anhydride is used. Typical anhydrides are orthophthalic anhydride, succinic anhydride, glutaric anhydride and the like.

One preferred polyester copolymer has a linear chain segment of a polyester of neopentyl glycol, hexane diol, isophthalic acid and azelaic acid and branched chain segments of a polyester of neopentyl glycol, trimethylol propane, isophthalic acid and azelaic acid and are esterified with orthophthalic anhydride. The molar ratio of linear chain segment/anhydride/branched chain segment is 1/1/1 and copolymer has a number average molecular weight of about 800–1,500 and a hydroxyl number of 125–155.

The polyester segments and polyester copolymer are prepared by conventional esterification procedures in which the components are charged into a polymerization vessel with solvents and usually a esterification catalyst and heated to about 100°–200° C. for about 30 minutes to 5 hours with removal of water that is formed during the process.

The crosslinking agent used in the composition is an organic polyisocyanate crosslinking resin to enable curing at ambient temperatures. Any of the conventional aromatic, aliphatic, cycloaliphatic, isocyanates, trifunctional isocyanates and isocyanate functional adducts of a polyol and a diisocyanate can be used. Typically useful diisocyanates are 1,6-hexamethylene diisocyanate, isophorone diisocyanate, 4,4'-biphenylene diisocyanate, toluene diisocyanate, bis cyclohexyl diisocyanate, tetramethylene xylene diisocyanate, ethyl ethylene diisocyanate, 2,3-dimethyl ethylene diisocyanate, 1-methyltrimethylene diisocyanate, 1,3-cyclopentylene diisocyanate, 1,4-cyclohexylene diisocyanate, 1,3-phenylene diisocyanate, 1,5-naphthalene diisocyanate, bis-(4-isocyanatocyclohexyl)-methane, 4,4'-diisocyanatodiphenyl ether and the like.

Typical trifunctional isocyanates that can be used are triphenylmethane triisocyanate, 1,3,5-benzene triisocyanate, 2,4,6-toluene triisocyanate and the like. Trimers of diisocyanates also can be used such as the trimer of hexamethylene diisocyanate which is sold under the tradename "Desmodur" N-3390.

Isocyanate functional adducts can be used that are formed from an organic polyisocyanate and a polyol. Any of the aforementioned polyisocyanates can be used with a polyol to form an adduct. Polyols such as trimethylol alkanes like trimethylol propane or ethane can be used. One useful adduct is the reaction product of tetramethylxylidene diisocyanate and trimethylol propane and is sold under the tradename "Cythane" 3160.

One preferred combination is a blend of 50–60% by weight of polyester and 40–50% by weight of diisocyanate, which provides rapid ambient curing without sacrificing flexibility of the resulting finish.

The resulting finish formed by the primer composition should be flexible so that it can be used over flexible plastic substrates. Flexibility of the finish is determined by the mandrel bend test in which a panel coated with about 1.0 mil thick fully cured film of the coating decomposition is held at −29° C. and then bent around a ½ inch diameter steel mandrel with the coated side of the panel facing outward. The coating should not break or crack.

As mentioned above, the composition also contains a combination of graphite and carbon black pigments that are electrically conductive. Graphites suitable for use in the practice of the present invention may be either natural or synthetic, preferably synthetic. Examples of such graphites include conductive grades such as M440, M450, M490, M850, M890 and 4934 (sold by Asbury Graphite Mills, Inc., Asbury, N.J.). Graphites may have a mean particle size of about 1 to 15 micron, preferably in the range of about 3 to 9 micron. Graphites having mean particle size of 5 micron are most preferred.

Examples of carbon black pigments suitable for the practice of the present invention include conductive grades such as CONDUCTEX 975 ULTRA (sold by Columbian Chemical Company, Atlanta, Ga.), Printex XE-2 (sold by Degussa, Frankfurt, Republic of Germany), BLACK PEARLS 2000 (sold by Cabot Corporation, Boston, Mass.). Conductive furnace black can also be used such as Vulcan XC 72-R furnace black pigment that does not have a surface treatment.

In addition to the above described electrically conductive pigments, a variety of pigments, organic dyes and lakes can also be used in the composition provided that the conductivity remains at least 100 Ransburg units under the specified curing conditions. Conductive coatings of the present invention are preferably gray in color and the blackness of the coating is preferably altered by the addition of titanium dioxide. Adding titanium dioxide to conductive coatings lightens coating color. Adding other coloring organic or inorganic pigments to the conductive coating may form different coating colors. Extender pigments such as barium sulfate, china clay, and/or talc may also be added to the compositions of the present invention, although they are generally not preferred.

The pigments can be introduced into the primer composition by first forming a mill base with the polyester copolymer or with another compatible polymer or dispersant by conventional techniques such as sand grinding, ball milling, attritor grinding or two roll milling. The mill base is blended with other constituents used in the composition.

Any of the conventional solvents or blends of solvents can be used to form the primer composition provided that the selection of solvents is such that the polymeric binder constituents are compatible and give a high quality primer. The following are examples of solvents that can be used to prepare the composition: methyl ethyl ketone, methyl amyl ketone, methyl isobutyl ketone, toluene, xylene, acetone, ethylene glycol monobutyl ether acetate and other esters, ethers, ketones and aliphatic and aromatic hydrocarbon solvents that are conventionally used.

The compositions of the present invention also preferably contain a sufficient amount of catalyst to cure the composition at ambient temperatures. Generally, about 0.01–2% by weight, based on the weight of the binder, of catalyst is used. Acid catalysts are generally preferred. Acid catalyst that may be used in the practice of the present invention include, in part, para-toluene sulfonic acid (Nacure 2500), phenyl acid phosphate (Nacure 4575), dodecylbenzene sulfonic acid (Nacure XP-221, dinonylnaphthalene disulfonic acid, or combinations thereof. The Nacures are sold by King industries, Norwalk, Conn. Any of the other catalysts customarily employed to promote crosslinking between hydroxyl-functional polyesters and isocyanates may also be used.

To improve weatherability, the composition can also contain about 0.01–2% by weight, based on the weight of the binder, of ultraviolet light stabilizers which term includes ultraviolet light absorbers, screeners quenchers and antioxidants. Typical ultraviolet light stabilizers include benzophenones, triazines, triazols, benzoates, hindered amines and blends of thereof.

Other additives that can optionally be added to compositions of the present invention include surface tension modifiers, rheology control agents, antipopping additives polyacryate, aryl acrylate, modified polysiloxanes or combinations thereof.

The composition of the present invention is preferably formulated as a two-pack coating with the isocyanate and hydroxyl-polyester components stored separately and mixed just prior to use. The other components are typically preblended with the hydroxyl-polyester component and stored in the same container.

The primer composition can be applied to a flexible or rigid substrate by conventional techniques such as spraying, electrostatic spraying, dipping, brushing, flowcoating and the like. As mentioned above the preferred method is electrostatic spraying. After application, the composition is air dried at ambient temperatures for at least about 4 to 8 hours but moderately higher temperatures up to about 50° C. for 30 minutes can be used, to form a conductive primer coating layer about 0.1–2.0 mils thick. Generally the primer layer is about 0.5–1.5 mils thick. No primer bake is therefore needed in the present invention. As soon as the finish is set and has the desired conductivity, the top coat can be applied to the vehicle. Conventional solvent borne or water borne top coats such acrylic enamels or lacquers, acrylic polyurethane coatings, polyesterurethane coatings, alkyd enamels and the like or powder topcoats can be applied and then baked to form a durable automotive or truck finish on the substrate.

The following example illustrates the invention. All parts and percentages are on a weight basis unless otherwise indicated. Molecular weights are determined by GPC (gel permeation chromatography) using polymethyl methacrylate as the standard.

EXAMPLE

Polyester Resin 1

A polyester polyol resin solution was prepared by charging the following constituents into a polymerization vessel, equipped with a mechanical stirrer, an electric heating mantle, a nitrogen inlet tube, a water separator, a thermometer, an addition funnel and a water cooled reflux condenser, and prepared as follows:

|  | Parts by Weight |
| --- | --- |
| Portion 1 | |
| Neopentyl Glycol | 200.18 |
| 1,6 Hexanediol | 53.96 |
| Trimethylpropane | 115.29 |
| Isophthalic Acid | 94.58 |
| Azelaic Acid | 294.63 |
| Phthalic Anhydride | 63.64 |
| Portion 2 | |
| Xylene | 62.12 |
| Portion 3 | |
| Toluene | 14.57 |
| Xylene | 11.70 |
| Portion 4 | |
| Methyl ethyl ketone | 76.98 |
| Total | 987.65 |

Portion 1 was charged into the polymerization vessel and with stirring, heated to 125°–150° C. for about 1 hour. Portion 2 was then added and water was distilled off at a temperature of about 220°–225° C. Thereafter, Portion 3 was added and then Portion 4 was added and the composition was cooled to room temperature. The resulting polyester solution had a solids content of about 80% and the polyester had a hydroxyl number of about 120–150 and a number average molecular weight of about 1,200 and had a molar ratio of branched polyester/orthophthalic anhydride/linear polyester of 1:1:1.

Polyester Resin 2

A second polyester polyol resin solution was prepared by charging the following constituents into a polymerization vessel equipped as above and prepared as follows:

|  | Parts by Weight |
| --- | --- |
| Portion 1 | |
| Neopentyl Glycol | 333.81 |
| Trimethylpropane | 79.95 |
| Ammonium Hydroxide | 58.25 |
| 1,4-Cyclohexane Dicarboxylic Acid | 205.70 |
| Isophthalic Acid | 176.40 |
| Monobutyl Tin Oxide Catalyst | 0.60 |
| Portion 2 | |
| Methyl isobutyl ketone | 174.77 |
| Total | 1029.48 |

Portion 1 was charged into the polymerization vessel and with stirring heated to 200° C. over 3 hour period and cooked to acid number 10–15, kettle solids=100%. Portion 2 was then added and the composition was cooled to room temperature. The resulting polyester solution had a solids content of about 80%, hydroxyl number 160–185, and a number average molecular weight of about 2,100.

Conductive Pigment Dispersion 1

A pigment dispersion (or millbase) was prepared as follows:

|  | Parts by Weight |
| --- | --- |
| Polyester resin solution 1 (prepared above) | 16.80 |
| Polyester resin solution 2 (prepared above) | 15.81 |
| 2-Ethyl hexyl acetate | 3.06 |
| Methyl n-amyl ketone | 17.29 |
| Acetone | 17.49 |
| "Aromatic" HC (182–219° C.) | 4.15 |
| Conductive Synthetic Graphite ("Grade 4934" by Asbury Graphite Mills, Inc.) | 25.40 |
| Total | 100.0 |

The above constituents were charged into a Dual Blade Impeller (DBI) equipment and ground for 3 hours.

Conductive Pigment Dispersion 2

A second pigment dispersion (or millbase) was prepared as follows:

|  | Parts by Weight |
| --- | --- |
| Polyester resin solution 1 (prepared above) | 31.65 |
| 2-Ethyl hexyl acetate | 9.02 |
| Methyl n-amyl ketone | 45.09 |

-continued

|  | Parts by Weight |
| --- | --- |
| A-B dispersant (41% solids in propylene carbonate/tetrahydrofuran/ butyl acetate/benzyl trimethyl ammonium hydroxide/water in a weight ratio of 35.9/24.6/37.5/1.5/0.5 of acrylic copolymer of glycidyl methacrylate/ butyl methacrylate/methyl methacrylate/dimethyl ketene methyl trimethylsilyl acetal/p-nitrobenzoic acid in a weight ratio of 27.4/39.0/15.6/1.5/16.5 and having a number average molecular weight of 7,000–12,000 and an acid number of about 4.0) | 9.47 |
| Conductive Carbon Black (Printex XE-2 by Degussa Inc) | 4.77 |
| Total | 100.0 |

The above constituents were mixed together for about 30 minutes. The mixture was then charged into a 2-liter Netsch LMZ media mill containing 0.6–0.8 mm zirconia media and ground at a tip speed=14 m/sec at flow rate=14 sec/half-pint for 1 hour in a one tank recirculation process.

Pigment Dispersion 3

A third pigment dispersion (or millbase) was prepared as follows:

|  | Parts by Weight |
| --- | --- |
| Acrylic resin (75% solids in methyl amyl ketone of an acrylic copolymer of styrene/methyl methacrylate/butyl acrylate/2-hydroxyethyl acrylate in a weight ratio of 15/15/40/30 and having a number average molecular weight of 6,000–10,000 and a hydroxyl number about 130–160 (on solids) and an acid number of about 2–5) | 22.4 |
| Propylene glycol monomethyl ether acetate | 12.0 |
| Organophillic clay | 0.6 |
| TiO$_2$ ("Ti-Pure" R-706 by DuPont) | 65.0 |
| Total | 100.0 |

The above constituents were mixed together for about 6 hours at high speed by using DBI mixing equipment and then was charged into a 16 gallon sand mill (0.8 mm glass media) and ground by 2 passes at 45 gallons/hour. After the completion of the grind, the dispersion was further let down with additional resin and solvent as follows:

|  | Parts by Weight |
| --- | --- |
| Pigment Dispersion 3 (prepared above) | 91.1 |
| High solids enamel resin (70% solids in "Aromatic" HC 150–190° C. of an acrylic enamel of butyl methacrylate/hydroxypropyl acrylate in a weight ratio of 60/40 and having a number average molecular weight of about 7,000 and an acid number of about 2–7) | 3.5 |
| Butyl acetate | 5.4 |
| Total | 100.0 |

The above constituents were mixed together for 1 hour by DBI mixing equipment.

Pigment Dispersion 4

A fourth pigment dispersion (or millbase) was prepared as follows:

| | Parts by Weight |
|---|---|
| Acrylic resin (same as used for Dispersion 3) | 48.6 |
| A-B dispersant | 3.7 |
| (55% solids in 50/25/25 mixture of butyl acetate/ propylene carbonate/tetrahydrofuran of an acrylic AB block copolymer of methyl methacrylate/butyl methacrylate in a weight ratio of 50/50 and having a polymer segment number average molecular weight of about 8,000) | |
| Propylene glycol monomethyl ether acetate | 34.0 |
| Phthalocyanine blue pigment | 13.7 |
| Total | 100.0 |

The above constituents were combined and the dispersion mixture was mixed 30 minutes at high speed by using DBI mixing equipment and then was ground using a 25 gallon Sholdmill (0.8 mm stainless steel) by 8 passes at 100 gallons/hour rate. After the completion of the grind, the dispersion was further let down with additional resin and solvent mixture as follows:

| | Parts by Weight |
|---|---|
| Pigment Dispersion 4 (prepared above) | 77.15 |
| High solids enamel resin (same as used in Pigment Dispersion 3) | 11.61 |
| Butyl acetate | 11.24 |
| Total | 100.0 |

The above constituents were mixed together for 1 hour by DBI mixing equipment.

Conductive Primer Composition

The conductive primer composition described below is an example of a coating that when hardened becomes conductive after the air dry or low bake conditions, though generating the surface for topcoats to be applied electrostatically.

A light gray conductive coating composition of the invention was prepared by preblending together the following constituents:

| | Parts by Weight |
|---|---|
| Pigment Dispersion 1 | 69.13 |
| Pigment Dispersion 2 | 12.48 |
| Pigment Dispersion 3 | 13.65 |
| Pigment Dispersion 4 | 0.22 |
| Polyester Resin 1 | 3.70 |

The following ingredients were combined with the preblend prepared above:

| | |
|---|---|
| 2-Ethyl Hexyl Acetate | 0.09 |
| "Resiflow" S by Estron Chemicals | 0.17 |
| (50% solution of an acrylic terpolymer flow control agent in "Solvesso" 100) | |
| "Tinuvin" 292 UV screener by Ciba Specialty Chemicals | 0.17 |
| (10% solution of Bis(1,2,2,6,6-pentamethyl-4- piperidinyl) sebacate in xylene) | |
| Dibutyl Tin Dilaurate solution | 0.39 |
| (contains approximately 17–18% Tin; "Fascat" 4202 catalyst by Atofina Chemicals, Inc.) | |

The resulting primer composition had a solids content of 53.96%, an overall pigment/binder ratio of 95.4/100, and is gray in color.

The primer was activated by adding (on a volume basis) 1 part by of 1,6-hexamethylene diisocyanate based polyisocyanate crosslinker/activator solution, having solids content of 75% ("Desmodur" XP-7124E by Bayer Corporation) to 4 parts of primer. The primer was then reduced to spray viscosity of 11–15" measured with a No. 3 Zahn cup at 25° C., with methyl amyl ketone. This resulted in a primer having a solids content of 58.08%, a pigment to binder ratio of 57.4/100, and VOC equal to 3.413 lbs/gal.

The primer was then sprayed using conventional spray equipment onto fiber glass reinforced polyester panel, a reaction injection molded urethane panel and a partially crystalline polyamide panel. The panels were either baked for 30 minutes at about 120° F. or air dried at room temperature for at least 8 hours before testing the surface of the primer for dry conductivity. The panels had had a gray color, a dry film thickness of about 1.2–1.4 mils and a gloss measured at 60° gloss of 10–30 range.

Each of the primer finishes had a conductivity of at least 120 Ransburg units.

Test panels were then prepared from the above prepared panels for lab evaluation. The panels were either left untopcoated (Panel 1) or topcoated (Panel 2) using electrostatic spraying with a conventional high solids acrylic urethane single stage "Imron" 5000 by DuPont topcoating (3.5 #/gal VOC). Topcoated panels were baked for 30 min. at 180° F. (83° C.). The resulting dry film thickness was about 1.8 to 2.2 mil.

Control Panels 3 and 4 were also prepared by spraying each of the panels with a commercial conductive primer (described below), used in the Heavy Duty Truck industry. The panels were baked for 30'×180° F. The panels were black in color, had a dry film thickness of about 1.2–1.4 mils and gloss measured at 60° gloss of 12–20 range. Each of the primer finishes had a conductivity of at least 120 Ransburg units.

The commercial conductive primer that was used for control was formulated by mixing Du Pont 373P24816 (pigmented component) and Du Pont 193S (crosslinker/activator) in a 4/1 volume ratio (weight ratio of 350 g of 373P24816/100 g of 193S) to form a composition having a total solids content of 53.93%, binder solids of 40.91%, pigment to binder weight ratio of 32/100, VOC (#/gal) 3.485, and a gallon weight (#/gal) of 8.47. The binder of the primer is a polyester polyol resin solution. The pigment portion of the 373P24816 primer contains conductive carbon black pigment in the amount of 1.66% on the total formula composition by weight and is free of graphite. The activator/crosslinker (193S) contains 1,6-hexamethylene diisocyanate based polyisocyanate solution, having solids content of 75% ("Desmodur" XP-7124E by Bayer Corporation).

Test panels were then prepared from the above prepared control panels for lab evaluation. The panels were either left untopcoated (Control Panel 3) or topcoated (Control Panel 4) using the same DuPont "Imron" topcoat paint and the same application method, as indicated above.

The transfer efficiency of the topcoat paint for each topcoated panel was excellent as could be expected for a conductive substrate and the topcoat has excellent adhesion to the primer coat and had automotive level of gloss and distinctness of image.

Each of the coated panels passed a ½ inch mandrel bend test at −29° C. in which the panel is bent 180° with the coating facing outward around the ½ inch mandrel.

The other test results are shown below in Table 1 and also in a section following the table entitled "Stability Testing for Conductivity."

TABLE 1

| Tests | Panel 1 Primer Only | Panel 2 Primer/ Topcoat | Control Panel 3 Primer Only | Control Panel 4 Primer/ Topcoat |
|---|---|---|---|---|
| Dry Film Thickness (mil) | 1.2–1.4 mil. | 1.8–2.2 | 1.2–1.4 | 1.8–2.2 |
| 60° Gloss | 30 | 90 | 15 | 90 |
| Dry Adhesion | 5B | 5B | 5B | 5B |
| Wet Adhesion | 5B | 5B | 5B | 5B |
| Humidity Blistering | 10 | 10 | 10 | 10 |
| Solvent Resistance (MEK double rubs Air dry 120 min at 77° F./50% RH) (ASTM D5402 rating) | 15 1 | 15 1 | 15 1 | 15 1 |
| Gravelometer | 7A | 7A | 7A | 7A |
| Impact Resistance | Direct > 160 | Direct > 160 | >160 | >160 |
| Conductivity | | | | |
| 30' × 120° F. bake | >120 RU | N/A | unachievable | N/A |
| 8-hr R.T. dry | >120 RU | N/A | unachievable | N/A |
| 30' × 180° F. | N/A | N/A | 120 RU | N/A |

Shelf Stability Testing for Conductivity

Particular advantages of the novel coating composition of this invention compared to the existing commercial formulation lies in the fact that it is capable not only to provide good surface conductivity at low bake or air dry conditions, but in the fact that it offers unprecedented long shelf life primer stability. The commercial 373P24816 primer has very short shelf life. The material becomes unconductive after 3 months. This creates economical disadvantages, negatively affecting both, manufacturer and customer. Testing results indicate that the novel coating composition provides excellent conductivity after 18+ months of shelf life.

Testing Procedures used in the Examples

60° Gloss—Test method ASTM D523—10–30 gloss range for primer established.

Dry Film Thickness—test method ASTM D4138—1.2–1.4 mils (30.0 to 35 microns) for primer, 1.8–2.2 mils (45 to 55 microns) for topcoat.

Tape Crosshatch Adhesion—test method ASTM D3359—method B, determines initial adhesion/crosshatch test (Rating 0–5 where 0 shows a complete failure of the coating adhesion and 5 shows no loss of adhesion). Minimum acceptable adhesion rating is 3.

Dry Conductivity of the coating—measured using the Ransburg Sprayability Meter (Model 8333-00) sold by Ransburg Corporation, Indianapolis, Ind. The measurements were taken by using the equipment operating instructions from the supplier. RU is the abbreviation for Ransburg units.

Humidity Test—evaluation of humidity adhesion for 500 hrs, check at 250 hrs, blistering—test method ASTM D2247, D3359, D1654, D714. Use ASTM D1654 for rating. 8A adhesion min., 9B blister min.

Solvent Resistance—use Toluene, minimum 5 double rubs—test method ASTM D5402. Rating 0—no change to a paint surface; 5—severe/very obvious change to a paint surface.

Flexibility Impact—use a ⅝ diameter indenter, 30-in-lbs for Aluminum panels, 60 in-lbs for Steel panels—test method ASTM D2794. Paint shall exhibit no cracking.

Gravelometer—test method ASTM SALJ400/D3170—a panel is conditioned for 1 hour at −17.8° C. prior to testing (rating 1–10, where 1 is complete chipping off of paint and 10 is no noticeable chipping; size of chips are rated as follows: A<1 mm, B 1–3 mm, D>6 mm). The panel must have a rating of 5A/6B to be acceptable.

What is claimed is:

1. A flexible conductive primer coating composition containing solvents and 40–75% by weight of film forming binder and pigments in an overall pigment to binder weight ratio of about 1:100 to 200:100; wherein the binder comprises
   (A) a polyester copolymer having linear segment with hydroxyl groups that has a hydroxyl number of about 15–300 and a number average molecular weight of about 300–3,000 and branched segments that have hydroxyl groups and have a hydroxyl number of about 175–300 and a number average molecular weight of about 500–2,000 and are attached to linear segment by esterification of the hydroxyl groups with a diacid or an anhydride and
   (B) an organic polyisocyanate crosslinking agent; and
   wherein the pigments comprise electrically conductive pigments in a pigment to binder weight ratio of about 1:100 to 130:100, and the electrically conductive pigments consist essentially of a combination of graphite and carbon black pigments in a graphite to carbon black weight ratio of about 120:1 to 1:1, and the composition forms a coating having a surface conductivity of at least 100 Ransburg units when cured at ambient temperatures or low bake temperatures.

2. The coating composition of claim 1 in which the film forming binder comprises about
   (A) 40–70% by weight, based on the weight of the binder, of a polyester copolymer having linear segment with hydroxyl groups that has a hydroxyl number of about 15–300 and a number average molecular weight of about 300–3,000 and branched segments that have hydroxyl groups and have a hydroxyl number of about 175–300 and a number average molecular weight of about 500–2,000 and are attached to linear segment by esterification of the hydroxyl groups with a diacid or an anhydride and
   (B) 30–60% by weight of an organic polyisocyanate crosslinking agent.

3. The coating composition of claim 1 wherein the composition forms an electrically conductive flexible coating on a substrate whereby the coated substrate can be bent 180° around a ½ inch mandrel with the coating facing outward and tested at −29° C. and the coating has a surface conductivity of at least 125 Ransburg units.

4. The coating composition of claim 1 in which the organic polyisocyanate is a trimer of hexamethylene diisocyanate.

5. The composition of claim 1 in which the composition contains about 0.1–2% by weight of the binder, of a catalyst.

6. A flexible plastic substrate coated with a dried and cured layer of the composition of claim 1.

7. A process for coating flexible plastic auto or truck body or parts thereof on an auto or truck assembly line with a conductive primer composition, comprising:
   (A) applying the conductive primer of claim 1 to the body or part;
   (B) drying the primer at ambient temperatures or low baking temperatures up to 50° C. to form a hardened layer of electrically conductive material on the body or part.

8. The process of claim 7 in which no primer bake step is required.

9. The process of claim 7 comprising the step of electrostatically applying an auto or truck topcoat finish to the coated part.

10. A primer composition comprising solvents and about 40–75% by weight of a film forming binder and pigments in a pigment to binder ratio of about 1:100–200:100; wherein the pigments comprise a combination of electrically conductive graphite and carbon black pigments in a graphite to carbon black weight ratio of about 120:1 to 1:1, and the binder consists essentially of about
   (1) 40–70% by weight, based on the weight of the binder, of a polyester copolymer having linear segment with hydroxyl groups consisting essentially of the esterification product of a straight chain diol having 2–10 carbon atoms and an aliphatic dicarboxylic acid or an aromatic dicarboxylic acid or a mixture of said dicarboxylic acids; said linear segment having a hydroxyl number of about 15–300 and a number average molecular weight of about 300–3,000 and branched segments having hydroxyl groups consisting essentially of the esterification product of a straight chain diol having 2–10 carbon atoms, a branched chain polyol and an aliphatic dicarboxylic acid or an aromatic dicarboxylic acid or mixture of said dicarboxylic acids said branched segments having a hydroxyl number of about 175–300 and number average molecular weight of about 500–2000 and being attached to linear segment by esterification of hydroxyl groups with a diacid or an anhydride wherein molar ratio of linear segment/diacid or anhydride/branched segment is about 1/1/1;
   (2) 30–60% by weight of an organic polyisocyanate crosslinking agent consisting essentially of a trimer of hexamethylene diisocyanate;
   wherein the composition forms a hard flexible electrically conductive coating on a plastic substrate whereby the coated plastic can be bent 180° around a ½ inch mandrel with the coating facing outward and the coating exhibits substantially no breaks or cracks when tested at −29° C. and the coating has a surface conductivity of at least 125 Ransburg units when cured at ambient or low baking temperatures up to 50° C.

11. A flexible plastic substrate coated with a dried and cured layer of the composition of claim 10.

12. The coated substrate of claim 11 in which the substrate is the exterior of an automobile.

* * * * *